United States Patent [19]

Fowler et al.

[11] Patent Number: 5,236,303
[45] Date of Patent: Aug. 17, 1993

[54] GAS TURBINE ENGINE STRUCTURAL FRAME WITH MULTI-CLEVIS RING ATTACHMENT OF STRUTS TO OUTER CASING

[75] Inventors: Laura A. Fowler; Kenneth J. Lenhart, both of Cincinnati, Ohio

[73] Assignee: General Electric Company, Cincinnati, Ohio

[21] Appl. No.: 766,255

[22] Filed: Sep. 27, 1991

[51] Int. Cl.$^5$ .............................................. F01D 25/28
[52] U.S. Cl. ................................... 415/190; 415/189; 415/209.2; 415/209.3; 415/210.1
[58] Field of Search ............... 415/142, 189, 190, 191, 415/208.1, 209.2, 209.3, 210.1, 213.1; 60/39.31

[56] References Cited

U.S. PATENT DOCUMENTS

| | | | |
|---|---|---|---|
| 1,124,029 | 1/1915 | Jude | 415/209.4 |
| 2,747,367 | 5/1956 | Savin | 60/39.31 |
| 2,807,433 | 9/1957 | Halford et al. | 415/209.4 |
| 2,869,941 | 1/1959 | Shoup, Jr. et al. | 415/142 |
| 2,941,781 | 6/1960 | Boyum | 415/142 |
| 3,250,512 | 5/1966 | Petrie | 415/135 |
| 3,620,641 | 11/1971 | Keen et al. | 415/170 |
| 4,428,713 | 1/1984 | Coplin et al. | 415/48 |
| 4,478,551 | 10/1984 | Honeycutt et al. | 415/142 |
| 4,722,184 | 2/1988 | Chaplin et al. | 415/210.1 |
| 4,979,872 | 12/1990 | Myers et al. | 415/142 |

FOREIGN PATENT DOCUMENTS 256069  2/1949  Switzerland ................ 60/39.31

Primary Examiner—Edward K. Look
Assistant Examiner—James A. Larson
Attorney, Agent, or Firm—Jerome C. Squillaro

[57] ABSTRACT

A structural frame component for use in a gas turbine engine having an outer casing includes an annular inner central hub, a plurality of circumferentially-spaced struts attached at their inner ends to the inner central hub and extending therefrom toward the outer casing of the engine, and an attachment ring including an annular member and a plurality of circumferentially-spaced clevises attached to the annular member and extending radially inwardly therefrom. The annular member encircles and is spaced radially outwardly from the outer ends of the struts and is releasably attached to the flanges on the turbine casings. Each clevis is releasably attached to the outer end of a respective one of the struts.

8 Claims, 2 Drawing Sheets

GAS TURBINE ENGINE STRUCTURAL FRAME WITH MULTI-CLEVIS RING ATTACHMENT OF STRUTS TO OUTER CASING

CROSS-REFERENCE TO RELATED APPLICATIONS

Reference is hereby made to the following copending U.S. patent applications dealing with related subject matter and assigned to the assignee of the present invention:

1. "Gas Turbine Engine Structural Frame With Multi-Yoke Attachment of Struts To Outer Casing" by Kenneth J. Lenhart et al, assigned U.S. Ser. No. 766,249 and filed Sep. 27, 1991.

2. "Gas Turbine Engine Structural Frame With Outer Casing Flange Pockets Gripping Strut Outer Ends" by James W. Brantly, assigned U.S. Ser. No. 766,298 and filed Sep. 27, 1991.

BACKGROUND OF THE INVENTION

1. Field of the Invention

The present invention relates generally to gas turbine engines and, more particularly, to a structural frame component in a turbine engine using a multi-clevis ring for attaching the outer ends of radial struts to the outer casing of the engine.

2. Description of the Prior Art

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the core engine extracts more energy from the gas stream for driving a forward fan. The forward fan provides the main propulsive thrust generated by the engine.

The static parts of a gas turbine engine, namely, frames, casings and mounts, are components that do not rotate but instead provide the overall backbone of the engine. These static components must maintain alignment between the rotors and stators of the engine. In many instances, this requirement dictates a need for stiffness, rather than strength, in the construction of the frames.

A structural frame component in a turbine engine is a static part that supports bearings which, in turn, support the rotatable rotors of the engine. The typical elements of a structural frame component, such as one located between the high and low pressure turbines of the engine, are an outer casing, an inner hub, and a plurality of circumferentially-spaced radial struts extending between the shells. The outer casing and inner hub are also commonly referred to as outer and inner rings or shells.

To protect frame struts from gases at high temperatures, for example 1900° F., flowing in the flowpath from the high pressure turbine to the low pressure turbine, an air-cooled, aerodynamically-shaped fairing or nozzle encases each of the frame struts. The nozzles are assembled about the frame struts by placing them over the outer ends of the struts. This must be carried out before one struts are attached to the outer casing. Thus, a mechanical connection of some type must be provided between the outer ends of the struts and the outer shell which can be readily assembled after the nozzles have first been installed over the struts.

However, in order to minimize engine performance losses, the nozzles installed over the struts and the struts themselves must be as thin as possible. Unfortunately, there is not sufficient material at the strut ends to enable radial bolting to the outer casing. Consequently, a need exists for a mechanical connection between the outer ends of the struts and the outer casing having a design which will achieve these requirements.

SUMMARY OF THE INVENTION

The present invention provides a multi-clevis attachment ring designed to satisfy the aforementioned needs. The multi-clevis attachment ring of the present invention has an overall size and simplicity of construction that reduces weight and increases reliability of the parts of the connection. The attachment ring provides a transition piece that has sufficient structure to enable interconnection of the thin struts to annular flanges of the outer casing of the engine.

Accordingly, the present invention is directed to a structural frame component for use in a gas turbine engine which comprises: (a) an annular inner central hub; (b) a plurality of circumferentially-spaced struts attached at their inner ends to the central hub and extending therefrom toward an outer casing of the engine; and (c) means for attaching the outer ends of the struts to the outer casing of the engine. The attaching means includes an annular member encircling and spaced radially outwardly from the outer ends of the struts and releasably attachable to the outer casing of the engine, and a plurality of circumferentially-spaced clevises attached to the annular member and extending radially inwardly therefrom. Each clevis is releasably attachable to the outer end of one of the struts.

More particularly, each clevis includes an inner bifurcated portion defining a slot which receives the outer end of the respective strut and an outer base portion attached to the inner bifurcated portion and to the annular member. Aligned holes are formed through the inner bifurcated portion and fasteners are provided for fitting through the aligned holes to releasably fasten the clevis at its inner bifurcated portion to the outer end of the strut. The clevis also has at least one threaded bore formed therein being open at an outer end of the outer base portion and extending radially inwardly toward the inner bifurcated portion of the clevis.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
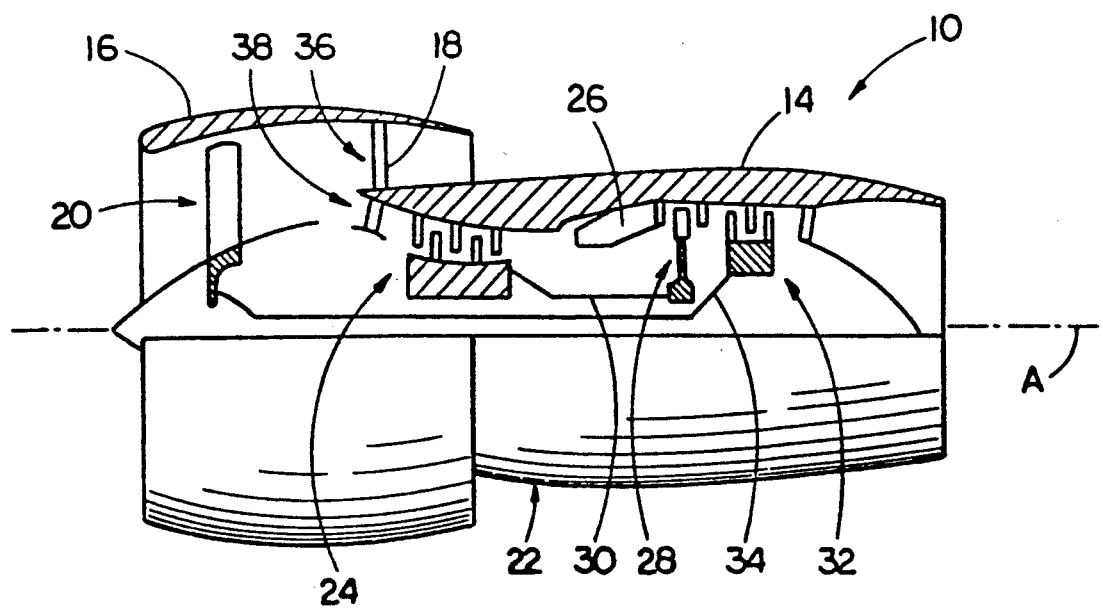
FIG. 1 is a schematic representation of a prior art gas turbine engine which can incorporate a structural frame component using a multi-clevis attachment ring of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Gas Turbine Engine

Referring now to the drawings, and particularly to FIG. 1, there is schematically illustrated a prior art gas turbine engine, generally designated 10, to which is applied a structural frame component 12 (FIG. 2) that can be modified to incorporate the present invention. The engine 10 has a longitudinal center line or axis A and an outer stationary annular casing 14 and nacelle 16 disposed coaxially and concentrically about the axis A. The nacelle 16 is supported about the forward end of the casing 14 by a plurality of struts 18, only one of which being shown in FIG. 1.

The engine 10 includes a forward fan 20 disposed within the nacelle 16 and a core gas generator engine 22 disposed rearwardly of the fan 20 and within the stationary casing 14. The core engine 22 is composed of a multi-stage compressor 24, a combustor 26, and a high pressure turbine 28, either single or multiple stage, all arranged coaxially about the longitudinal axis A of the engine 10 in a serial, axial flow relationship. An annular outer drive shaft 30 fixedly interconnects the compressor 24 and high pressure turbine 28. The engine 10 further includes a low pressure turbine 32 disposed rearwardly of the high pressure turbine 28. The low pressure turbine 32 is fixedly attached to an inner drive shaft 34 which, in turn, is connected to the forward fan 20. Conventional bearings and the like have been omitted from FIG. 1 in the sake of clarity.

In operation, air enters the gas turbine engine 10 through an air inlet of the nacelle 16 surrounding the forward fan 20. The air is compressed by rotation of the fan 20 and thereafter is split between an outer annular passageway 36 defined between the nacelle 16 and the engine casing 14, and a core engine passageway 38 having its external boundary defined by the engine casing 14. The pressurized air entering the core engine passageway 38 is further pressurized by the compressor 24. Pressurized air from the compressor 24 is mixed with fuel in the combustor 26 and ignited, thereby generating combustion gases. Some work is extracted from these gases by the high pressure turbine 28 which drives the compressor 24. The remainder of the combustion gases are discharged from the core engine 22 into the low pressure power turbine 32 to drive the forward fan 20. The portion of the air flow provided from the fan 20 through the outer passageway 36 produces the main propulsive thrust generated by the engine 10.

Figure 2:
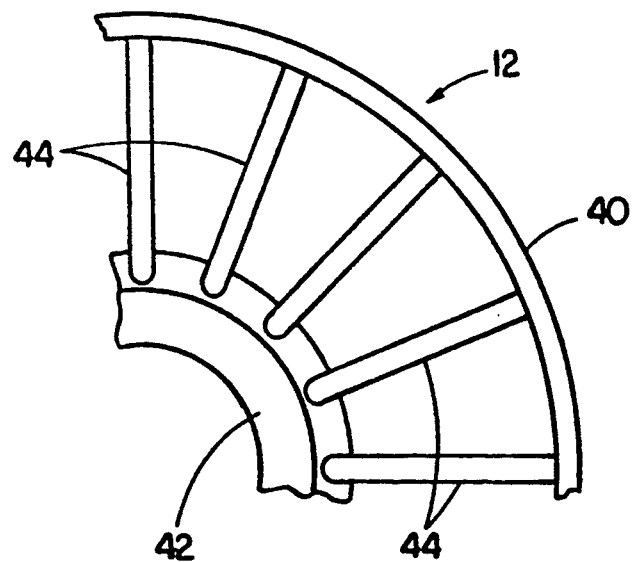
FIG. 2 is a fragmentary schematic representation of a structural frame component of an turbine engine.

Referring now to FIG. 2, there is illustrated an exemplary prior art annular structural frame component 12 which is incorporated by the engine 10. For instance, the frame component 12 can be located between the high pressure turbine 28 and the low pressure turbine 32 of the engine 10 shown in FIG. 1. The structural frame component 12 basically includes an annular outer shell 40, an annular inner central hub 42, and a plurality of radial struts 44 circumferentially-spaced from one another and extending between and connected to the outer shell 40 and inner central hub 42. The outer shell 40 is omitted from the modified construction of the structural frame component 12 illustrated in FIG. 3. Instead, respective aft and forward casing flanges 28A, 32A of the high and low pressure turbines 28, 32 are attached together by a plurality of fasteners 54, such as conventional bolts.

Figure 3:
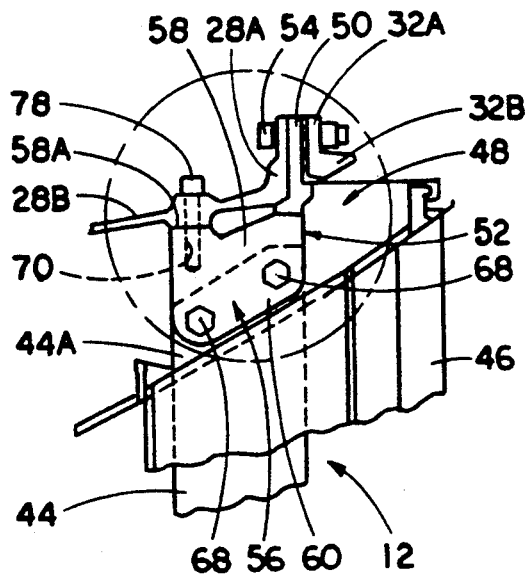
FIG. 3 is a fragmentary enlarged side elevational view of a structural frame component and one clevis of the attachment ring of the present invention.

To protect the radial frame struts 44 from high temperature gases in the flowpath from the high pressure turbine 28 to the lower pressure turbine 32, an aerodynamically-shaped fairing or nozzle 46 encases each of the frame struts 44, as seen in FIG. 3. The nozzles 46 are assembled about the frame struts 44 by placing them over the outer ends 44A of the struts 44. This must be carried out before the struts 44 are attached to the outer casing or shell 40. Thus, a mechanical connection of some type must be provided between the outer ends 44A of the struts 44 and the outer casings 28B, 32B of the high and low pressure turbines 28, 32 which can be readily assembled after the nozzles 46 have first been installed over the struts 44.

Multi-Clevis Attachment Ring of the Invention

Figure 4:
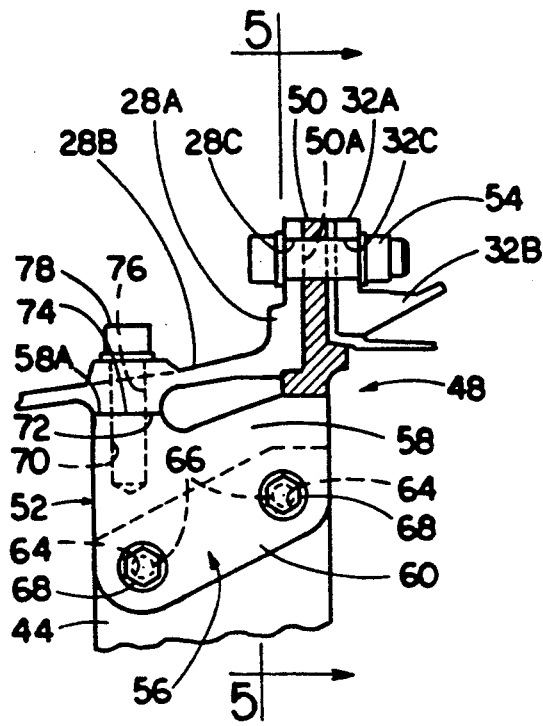
FIG. 4 is an enlarged view of the portion of the attachment ring contained in the dashed circle of FIG. 3 and with the nozzle being omitted.
Figure 5:
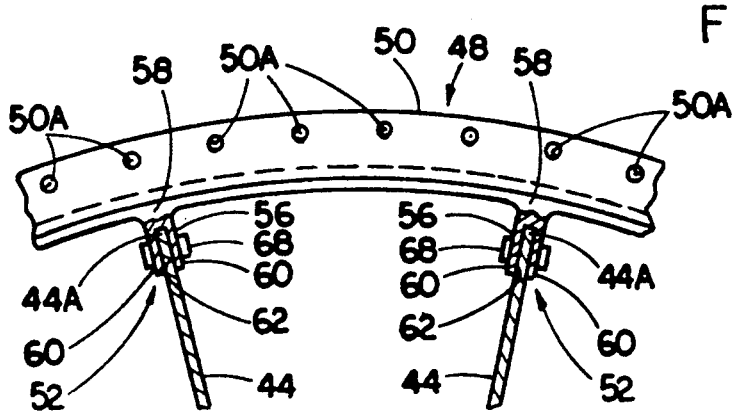
FIG. 5 is a fragmentary front elevational view, partly sectioned and on a reduced scale, of the attachment ring and radial struts as seen along line 5—5 of FIG. 4.

Referring now to FIGS. 3-5, there is illustrated a multi-clevis attachment ring, generally designated 48. The attachment rings 48 constitutes a means for attaching the outer ends 44A of the struts 44 to the outer casing 14 of the engine 10, more particularly to the outer casings 28B, 32B of the high and low pressure turbines 28, 32. Basically, the attachment ring 48 includes an annular member 50 encircling and spaced radially outwardly from the outer ends 44A of the struts 44 and a plurality of circumferentially-spaced clevises 52 attached to the annular member 50 and extending radially inwardly therefrom. The annular member 50 is releasably attached between the aft flange 28A of the high pressure turbine 28 and the forward flange 32A of the low pressure turbine 32, whereas each clevis 52 is releasably attached to the outer end 44A of one strut 44.

More particularly, the annular member 50 of the attachment ring 48 includes a plurality of circumferentially spaced holes 50A (best seen in FIG. 5) which align with pluralities of holes 28C, 32C in the respective high and low pressure turbine flanges 28A, 32A. Fasteners 54, such as conventional bolts, are installed through the aligned holes 50A, 28A, 32A to draw the flanges 28A, 32A together, clamping the annular member 50 therebetween.

As best seen in FIG. 5, each clevis 52 of the attachment ring 48 includes an inner bifurcated portion 56 and an outer base portion 58 integrally connected to the inner portion 56 and to the annular member 50. The inner bifurcated portion 56 of each clevis 52 is formed by a pair of generally parallel spaced tabs 60 which define a slot 62 between them. The slot 62 snugly receives the outer end 44A of the respective strut 44. Pairs of holes 64 are formed through the connecting tabs 60 of the inner bifurcated portion 56 which are aligned with one another and with holes 66 defined through the outer end 44A of the strut 44.

The attachment ring 48 also includes a plurality of fasteners 68 fitted through the aligned holes 64, 66 to releasably fasten the clevis 52 at its inner bifurcated portion 56 to the outer end 44A of the strut 44. The fasteners 68 can take any suitable form, such as expandable shear bolts or interference fitting shear pins.

The outer base portion 58 of each clevis 52 is integrally connected to the annular member 50. Also, the outer base portion 58 has a threaded bore 70 formed therein which opens at an outer end 58A thereof and is spaced forwardly of the annular member 50. The threaded bore 70 extends radially inwardly into the base portion 58 toward the inner bifurcated portion 56 of the clevis 52, stopping short of reaching the slot 62, as can be seen in FIG. 5. A pair of complementary engagable bolt pads or lands 72, 74 are defined respectively on the turbine casing 28B and clevis outer base portion 58. Openings 76 formed through the turbine casing 28B and lands 72 thereon align with the bores 70 in the outer base portions 58 of the clevises 52.

The attachment ring 48 also includes a plurality of fasteners 78, such as high strength bolts, which are inserted through the openings 76 and threaded into the radial bores 70 to securely, but releasably, attach the outer base portions 58 of the clevises 52 to the lands 72 on the turbine casing 28B. The attachment of the forward end of each clevis 52 by a radial fastener 78 to the turbine casing 28B increases the axial stiffness of the frame component 12.

Figure 6:
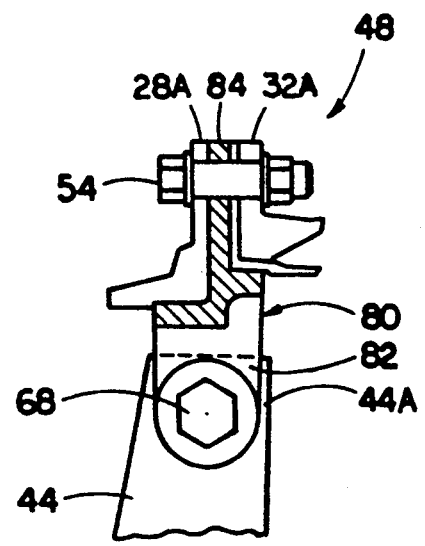
FIG. 6 is a view similar to that of FIG. 4 but illustrating an alternative embodiment of the attachment ring.

Referring to FIG. 6, there is shown an alternative construction of the attachment ring 48 wherein the portion of the clevis 52 shown in FIGS. 3 and 4 which extends forwardly from the annular member 50 has been omitted. Thus, there is no threaded bores in the clevis 80 and the tabs 82 thereof underlie the annular member 84. Only a single one of the fasteners 68 is employed to attached the clevis 80 to the upper end 44A of the strut 44.

Advantageously, the clevises 52 of the attachment ring 48 permit easy attaching of the frame struts 44 to the outer casing 14 and the use of thinner, more aerodynamically desirable frame struts than would otherwise be possible. Also, the attachment ring 48 provides not only a tight fit needed for frame stiffness, but also offers easy nozzle removal, as well.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof. The invention is not limited to the turbine region of the engine but may also apply to other areas such as cold regions which would include fan frames and compressor frames and hot regions which include turbine mid frames and turbine rear frames.

We claim:

1. A structural frame component for use in a gas turbine engine having an outer casing, said component comprising:
   (a) an annular inner central hub;
   (b) a plurality of circumferentially-spaced struts attached at their inner ends to said central hub and extending therefrom toward the outer casing of the engine; and
   (c) means for attaching outer ends of said struts to the outer casing of the engine, said attaching means including an annular member encircling and spaced radially outwardly from said outer ends of said struts and releasably attachable to the outer casing of the engine, said attaching means also including a plurality of circumferentially-spaced clevises attached to said annular member and extending radially inwardly therefrom, each of said clevises being releasably attachable to said outer end of a respective one of said struts;
   (d) each of said clevises including an inner bifurcated portion attached to said outer end of said one strut and an outer base portion connected to said inner bifurcated portion and attached to said annular member at an axially aft end of said outer base portion, said outer base portion of said each clevis having at least one threaded bore formed therein at an axially forward end of said outer base portion, said bore being open at an outer end of said outer base portion and extending radially inwardly into said base portion toward said inner bifurcated portion of said clevis;
   (e) said attaching means further including at least one threaded fastener being threadable into said radial bore to releasably attach said outer base portion of said clevis to the outer casing.

2. The frame component as recited in claim 1, wherein:
   said annular member has a plurality of circumferentially spaced holes alignable with pluralities of holes in circumferential flanges of the outer casing of the engine; and
   said attaching means includes a plurality of fasteners installed through the aligned holes so as to draw the flanges together, clamping said annular member therebetween.

3. The frame component as recited in claim 1, wherein:
   said inner bifurcated portion of each clevis includes a pair of generally parallel spaced apart tabs defining a slot therebetween, said slot being capable of receiving said outer end of said respective one strut; and
   said attaching means also including means for releasably fastening said outer end of said respective one strut to said tabs.

4. The frame component as recited in claim 3, wherein said fastening means includes:
   means defining holes through said outer end of said respective one strut;
   means defining holes through said tabs of said inner bifurcated portion which are aligned with one another and with said holes defined through said strut outer end; and
   a plurality of fasteners fitted through said aligned holes to releasably fasten said clevis at said inner bifurcated portion thereof to said outer end of said respective one strut.

5. In a gas turbine engine including high and low pressure turbines having respective outer casings with circumferential flanges thereon, a structural frame component, comprising:
   (a) an annular inner central hub;
   (b) a plurality of circumferentially-spaced struts attached at their inner ends to said central hub and extending therefrom toward the outer casings of the engine turbines; and (c) means for attaching outer ends of said struts to said turbine casings, said attaching means including an annular member and a plurality of circumferentially-spaced clevises attached to said annular member and extending radially inwardly therefrom, said annular member encircling and spaced radially outwardly from said outer ends of said struts and releasably attached to said flanges on said turbine casings, each of said clevises being releasably attached to said outer end of a respective one of said struts;

(d) each of said clevises including an inner bifurcated portion attached to said outer end of said one strut and an outer base portion connected to said inner bifurcated portion and attached to said annular member at an axially aft end of said outer base portion, said outer base portion of said each clevis having at least one threaded bore formed therein at an axially forward end of said outer base portion, said bore being open at an outer end of said outer base portion and extending radially inwardly into said base portion toward said inner bifurcated portion of said clevis;

(e) said attaching means further including at least one threaded fastener being threadable into said radial bore to releasably attach said outer base portion of said clevis to one of said outer casings.

6. The frame component as recited in claim 5, wherein:

said annular member has a plurality of circumferentially spaced holes aligned with pluralities of holes in said flanges on said turbine casings; and said attaching means also includes a plurality of fasteners installed through the aligned holes so as to draw the flanges together, clamping said annular member therebetween.

7. The frame component as recited in claim 5, wherein:

said inner bifurcated portion of each clevis includes a pair of generally parallel spaced apart tabs defining a slot therebetween, said slot being capable of receiving said outer end of said respective one strut; and said attaching means further including means for releasably fastening said outer end of said respective one strut to said tabs.

8. The frame component as recited in claim 7, wherein said fastening means includes:

means defining holes through said outer end of said respective one strut;

means defining holes through said tabs of said inner bifurcated portion which are aligned with one another and with said holes defined through said strut outer end; and a plurality of fasteners fitted through said aligned holes to releasably fasten said clevis at said inner bifurcated portion thereof to said outer end of said respective one strut.

* * * * *